United States Patent [19]

Whittingham et al.

[11] 4,104,923

[45] Aug. 8, 1978

[54] ULTRASONIC RADIATION BALANCE

[75] Inventors: Thomas Anthony Whittingham, Newcastle-upon-Tyne; Michael John Farmery, Peterborough, both of England

[73] Assignee: National Research Development Corporation, London, England

[21] Appl. No.: 827,335

[22] Filed: Aug. 24, 1977

[30] Foreign Application Priority Data

Sep. 3, 1976 [GB] United Kingdom .............. 56652/76

[51] Int. Cl.² .............................................. G01H 3/12
[52] U.S. Cl. ................................................... 73/646
[58] Field of Search .............. 73/645, 646, 647, 556, 73/557

[56] References Cited

U.S. PATENT DOCUMENTS

| | | | |
|---|---|---|---|
| 2,052,550 | 9/1936 | Alder | 73/646 |
| 2,939,542 | 6/1960 | Weller et al. | 73/646 |
| 3,915,017 | 10/1975 | Robinson | 73/646 |

*Primary Examiner*—S. Clement Swisher
*Attorney, Agent, or Firm*—Cushman, Darby & Cushman

[57] ABSTRACT

A radiation balance for testing the power of ultrasonic transducers involves a balance mechanism wholly immersed in transmission liquid in a windowed vessel to avoid surface tension effects. The mechanism comprises a target connected for movement with the coil of a moving coil/magnet assembly, such as from a galvanometer, and a null-seeking servomechanism energizes the coil in response to balance mechanism movement. The balance movement is about a vertical axis to avoid gravitational effects, and the target has neutral buoyancy.

5 Claims, 4 Drawing Figures

ULTRASONIC RADIATION BALANCE

There is a growing appreciation of the need for an instrument which provides a simple, quick and reliable method of checking the power outputs of ultrasonic transducers used in medical diagnostic equipment. The invention stems from this appreciation and the thought that the need may be met by a balance which measures the radiation force generated by the total reflection of an ultrasonic beam.

More specific requirements which have been considered in development of the invention are as follows:-

1. The power levels to be measured are very low, and range from 1 to 100 mW. Total reflection of 1 mW generates a force on the reflector of 0.14 mg and so a suitable balance should be able to measure forces in the approximate rnage 0.1 to 10 mg.

2. The majority of the ultrasonic equipments used for medical diagnosis are large and not easily moved. A suitable balance should therefore be portable and rugged enough to withstand frequent transportation. 3. A suitable balance should not involve lengthy setting-up procedures and a requirement for operation by highly skilled personnel. On the contrary, use of the balance should be sufficiently quick that clinical services are not unduly disrupted, and it is appropriate that the balance be operable by existing personnel who may be trained only in ultrasonic scanning procedures. 4. Transducers used in the relevant diagnostic equipments take many different physical forms and it is clearly desirable that the balance be compatible with as many different designs as possible.

5. It is desirable that the instrument be self-contained in respect of power supply.

Before development of the invention, two existing forms of balance were considered but both appeared unsatisfactory in respect of the above requirements. In one of these forms the reflector target for the beam is suspended by wires from one arm of a gravimetric balance so that the target is fully immersed in a suitable liquid. The beam is transmitted through the liquid to that the radiation force is directed vertically down on to the target and its magnitude measured directly. A principal disadvantage of this form of balance is that surface tension force is produced where the suspension wires enter the liquid and this force acts parallel to the radiation force to create error when the latter force is of low magnitude. In the second form the reflector target is also suspended and immersed, but in this case the target is usually a ball suspended by a single long wire and the beam is transmitted to direct the radiation force horizontally, with radiation force being measured by way of the suspension wire deflection. In this case the surface tension force acts at right angles to the radiation force, but a disadvantage arises with the necessary bulk to accommodate the target suspension.

An object of the invention is to provide an ultrasonic radiation balance which avoids the disadvantages of the above-discussed existing forms and allows the desired requirements to be met. To this end, the invention provides a balance in which the radiation force on a reflector target is balanced by a magnetic force in a null-seeking operation. The use of a magnetic restoring force allows the complete balance mechanism to be contained within a liquid environment thereby avoiding the effects of surface tension and permitting physical compaction compared to a partially immersed mechanism, and the use of a null-seeking operation allows good sensitivity. While it is possible to employ a gravimetric mechanism with the radiation and magnetic forces acting vertically about a fulcrum, this can be regarded as too delicate for field use and a moving coil/magnet mechanism, suitably in the form of a conventional galvanometer movement is preferably employed to provide both the fulcum and magnetic force generator. This preferred feature provides increased compactness and ruggedness, and also leads to economy in manufacture. Also while the balancing operation can be effected by manual control of the magnetic restoring force, it is preferred to use a servomechanism which automatically increases or decreases the force to oppose movement away from a chosen null position. This facility leads to simplicity of operation and preferably involves the provision of a flag fixed with the balance movement and located between the opposing elements of two light source/photoelectric assemblies which are connected in a differential manner to energise the balance movement coil.

A fuller understanding of the invention will be gained from the following description of one embodiment thereof, this description being given by way of example and with reference to the accompanying drawings in which:

FIG. 1 schematically illustrates the embodiment except for its housing,

Figure 1:
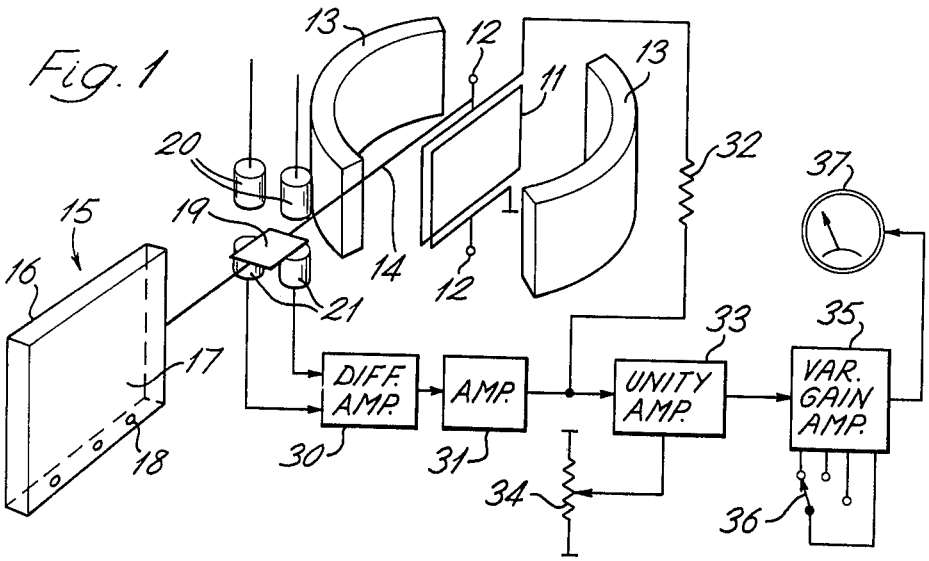

In FIG. 1 the balance mechanism comprises a moving coil galvonometer movement including a coil 11 freely pivotally mounted in pivots 12 for movements around a fixed vertical axis in the field of a permanent magnet 13. The pointer of this movement serves as a radial arm 14 by which a target 15 is fixed with the coil. The target consists of a hollow perspex box 16 with one major face made of thin copper foil to serve as a reflector 17.

This target is air-filled and weights 18 are attached to achieve neutral buoyancy when the mechanism is immersed and thereby eliminate undesirable stress on the pivots 12.

The arm also carries at an intermediate position therealong a flag 19. This flag is located between the opposing elements of two light souce/photoelectric assemblies which suitably each comprise a light emitting diode 20 and a photodiode 21 located in mutually facing manner. The outputs from the photodiodes are connected to a difference amplifier 30 which is connected in turn to a further amplifier 31. This further amplifier applies its output to the coil 11 by way of a current limiting resistor 32, and also to a unity gain amplifier 33 having an offset control 34. The output of this amplifier 33 is applied to a variable gain amplifier 35 having a gain-selector switch control 35, and this amplifier feeds an output display meter 37.

In the operation of the embodiment as so far described, when no radiation force is present, the flag normally partially masks the path between each of the light emitting diodes and their photodiodes such that the outputs from the latter cause no difference signal to energise the coil. When radiation force is applied to the target reflector, the balance arm is moved and the photodiode voltage outputs are correspondingly changed in opposite senses to give rise to a difference signal output. This output energises the coil to provide a magnetic force which reacts with that of the permanent magnet to produce a torque in the appropriate sense to restore the original null condition.

Practical considerations include the fact that the balance does not return precisely to its original position, but the consequential error can be made negligible by employing high gain in the first two amplifier stages. Also, the value of the difference signal is not zero in the absence of radiation force due to inevitable imbalances in the system. It is accordingly desirable to be able to zero the display meter before making a measurement and the off-set control of the third amplifier stage is provided for this purpose. It is also appropriate to provide a facility for changing the sensitivity in respect of different ranges of radiation power and this is the purpose of the selector switch in the fourth amplifier stage.

Figure 2:
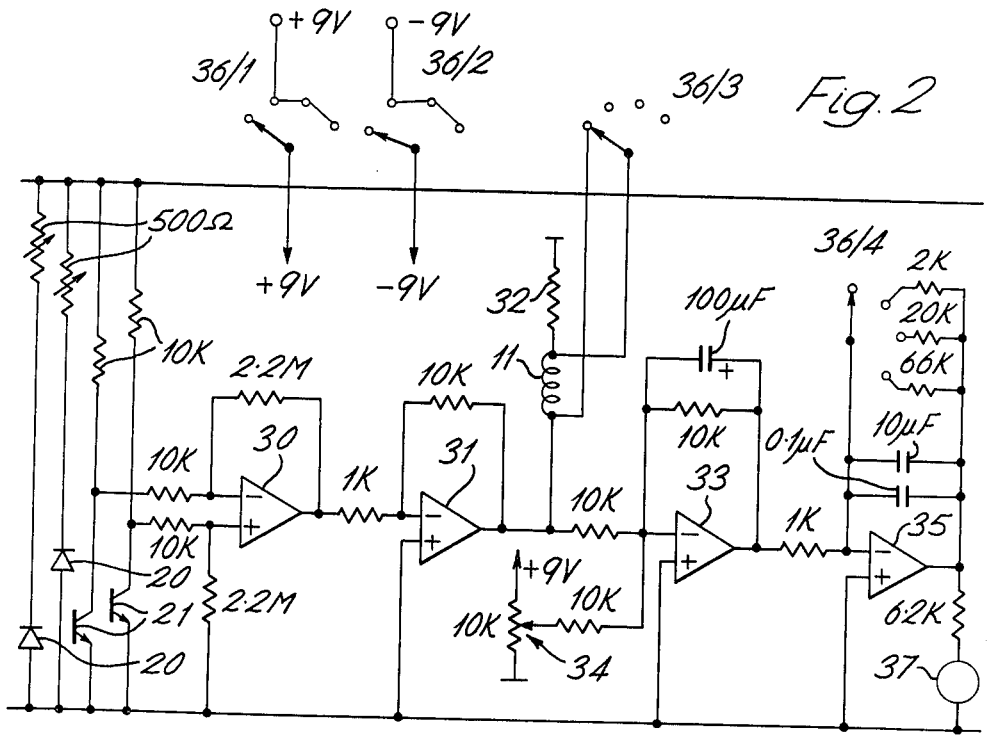
FIG. 2 is an electrical circuit diagram of part of FIG. 1.
Figure 3:
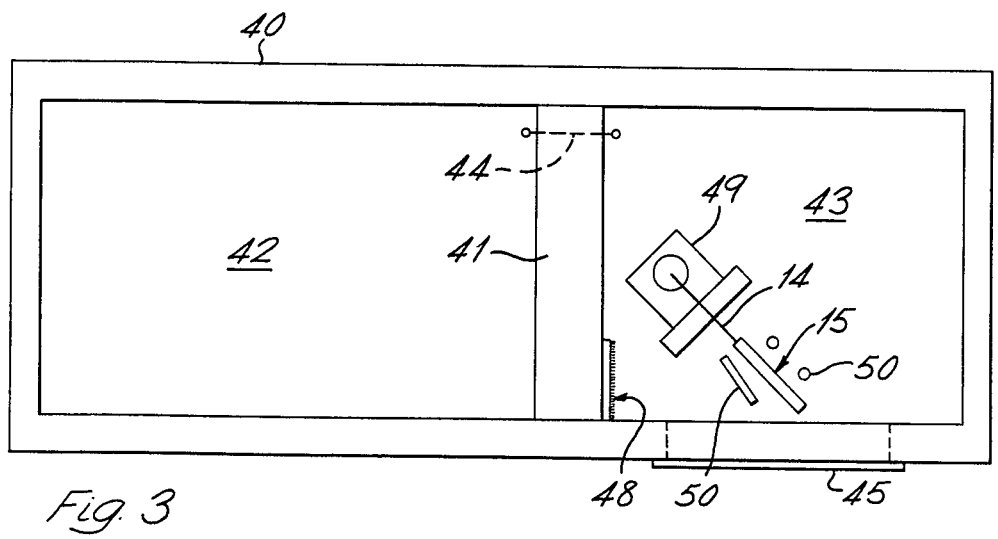
FIGS. 3 and 4 are respective plan (with lid removed) and side views of the housing.
Figure 4:
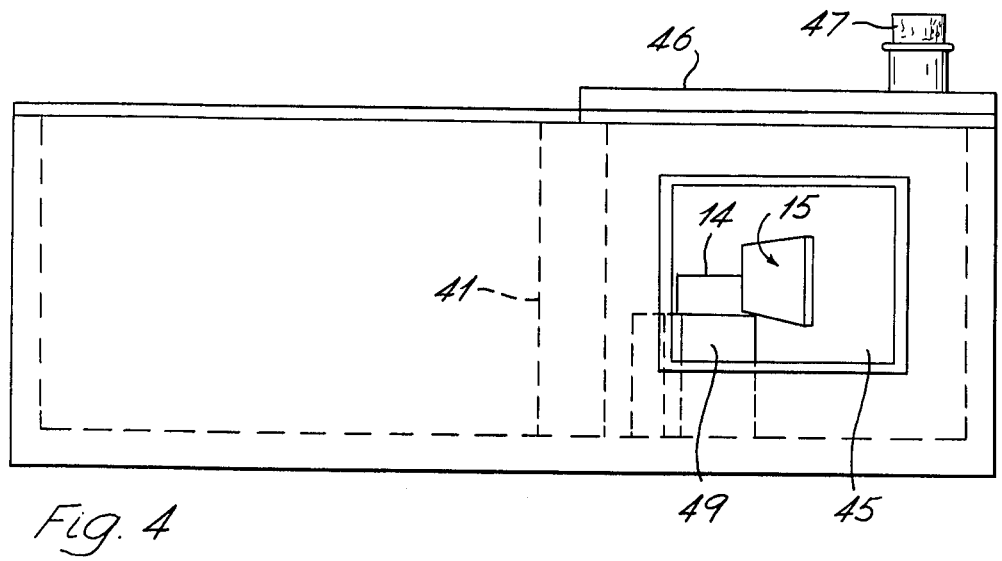

Details of the electrical circuit elements are shown by the diagram of FIG. 2 except for components 30, 31, 33 and 35 which are of type '741', and the meter 37 which is rated at 1 mA with 0–6V full scale deflection. Also, in this circuit the light emitting diodes and associated photodiodes are TIL138 packages (Texas Instruments) powered from the 9v supply via current limiting resistors adjusted to set the LED current at 39 mA. The selector switch 36 has four wafer sections connected to provide the following functions:-

(a) In position 1, the battery supply is disconnected and the balance is OFF.
(b) In position 2, the battery is connected and a 2K resistor is connected in the feedback loop of amplifier 35 to provide a gain suited to a 0 – 100 mW power range.
(c) In position 3, the situation is as for position 2 but with a 20K feedback resistor for a 0 – 10 mW power range.
(d) In position 4, the situation is modified by a 66K resistor for a 0 – 3 mW range.

The capacitors in the feedback loop of amplifier 35 reduce high frequency oscillations, and that for amplifier 33 damps out the effects of mechanical noise in the balance which would otherwise make the meter difficult to read.

The remaining two figures show the housing for the balance. This housing is basically a rectangular box 40 of perspex with a partition 41 of the same material to provide respective compartments 42 and 43 for the electronic components and the balance mechanism. Electrical connections are made by way of pins 44 passing through the partition.

The balance mechanism compartment has a polythene window 45 in its front face and a vented top cover plate 46 with a stopper plug 47, the window and cover plate being sealed with neoprene gaskets. In use, the compartment 43 is filled with a suitable ultrasonic transmission liquid medium, liquid paraffin being suitable for many applications. However, the attenuation coefficient does rise with frequency and a different medium should be used for transducers operating above 4 MHz. Some parts of the balance mechanism are shown and it is to be noted that the target is disposed at 45° to a window to direct reflections on to an absorption medium 48, which may be a piece of carpet, and thereby avoid problems associated with the generation of standing waves.

The balance mechanism is mounted on a perspex pedestal 49 which also carries the LED/photodiode packages. A transportation clamp 50 is located in the compartment 43. This clamp serves to move the target through a small angle of about 5° from its null position and hold the same against fixed studs to prevent strain on the moving coil mechanism during transportation.

We claim:

1. An ultrasonic radiation balance for testing the power of an ultrasonic transducer, comprising: a windowed vessel containing an ultrasonic transmission liquid; a balance mechanism housed in said vessel and wholly immersed in said liquid, said mechanism including a moving coil/magnet assembly and a radiation pressure sensitive member, with said coil and said member being connected for pivotal movement about a common substantially vertical axis, and with said member being located to receive radiation thereon from a transducer outside said vessel; and a servomechanism operable in response to said movement in said balance mechanism to energise said coil for movement to a null position.

2. A balance according to claim 1 wherein said servomechanism comprises two light source/photoelectric assemblies, and an opaque member connected for movement with said balance mechanism to pass between the opposing members of said assembly and thereby to vary the operation thereof, said assemblies being connected in a differential manner to energise said coil.

3. A balance according to claim 1 wherein said radiation pressure sensitive member is located for direct incidence of radiation from said transducer without reflection.

4. A balance according to claim 3 wherein said radiation pressure sensitive member presents, in its null position, a vertical face inclined at an angle to said window, and said vessel houses an ultrasound absorber to receive radiation reflected from said member.

5. A balance according to claim 1 wherein said radiation pressure sensitive member has a liquid-impermeable gas-filled hollow and is weighted to afford substantially neutral buoyancy.

* * * * *

UNITED STATES PATENT OFFICE
CERTIFICATE OF CORRECTION

PATENT NO. : 4,104,923
DATED : August 8, 1978
INVENTOR(S) : Thomas Anthony WHITTINGHAM and Michael John FARMERY It is certified that error appears in the above-identified patent and that said Letters Patent are hereby corrected as shown below:

IN THE HEADING

Item [30] Foreign Application Priority Data read "56652/76" as -- 36652/76 --

Signed and Sealed this

Twenty-seventh Day of February 1979

[SEAL]

Attest:

RUTH C. MASON
Attesting Officer

DONALD W. BANNER
Commissioner of Patents and Trademarks